(12) United States Patent
Terada

(10) Patent No.: US 7,402,044 B2
(45) Date of Patent: Jul. 22, 2008

(54) INSTALLATION APPARATUS

(75) Inventor: Tomoyasu Terada, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/509,580

(22) Filed: Aug. 25, 2006

(65) Prior Publication Data
US 2007/0087635 A1 Apr. 19, 2007

(30) Foreign Application Priority Data
Oct. 18, 2005 (JP) .......................... P2005-303297
Oct. 18, 2005 (JP) .......................... P2005-303298

(51) Int. Cl.
*H01R 33/00* (2006.01)

(52) U.S. Cl. ...................... 439/34; 174/72 A; 307/10.1; 361/826

(58) Field of Classification Search .................. 439/34; 174/72 A, 72 C; 307/10.1; 361/826
See application file for complete search history.

(56) References Cited

U.S. PATENT DOCUMENTS

| 6,811,404 | B2 * | 11/2004 | Doshita et al. ................ 439/34 |
| 7,042,738 | B2 * | 5/2006 | Tsubaki ....................... 361/826 |
| 7,053,306 | B2 * | 5/2006 | Tsubaki et al. ............. 174/72 A |
| 7,238,029 | B2 * | 7/2007 | Tsubaki ........................ 439/34 |
| 2004/0017648 | A1 | 1/2004 | Tsubaki |
| 2007/0148994 | A1 * | 6/2007 | Sato et al. ..................... 439/34 |
| 2007/0205015 | A1 * | 9/2007 | Ide ........................... 174/72 A |

FOREIGN PATENT DOCUMENTS

| DE | 29 03 430 A1 | 8/1980 |
| GB | 2340315 A | 2/2000 |
| GB | 2 408 498 A | 6/2005 |
| JP | 10-112922 A | 4/1998 |
| JP | 11-342807 A | 12/1999 |
| JP | 2003-306089 A | 10/2003 |
| JP | 2004-112984 A | 4/2004 |

* cited by examiner

*Primary Examiner*—Gary F. Paumen
(74) *Attorney, Agent, or Firm*—Sughrue Mion, PLLC

(57) ABSTRACT

An installation apparatus for installing a wire harness over a fixed structural body and a movable structural body which is slidably provided to the fixed structural body, the installation apparatus includes a case that receives the wire harness such that the wire harness extends in a sliding direction of the movable structural body, and is folded back into a generally U-shape, and a slider that holds a distal end-side portion of the wire harness extending from the folded-back portion toward a distal end of the wire harness, and is slidably supported on the case so as to move in the sliding direction of the movable structural body, and is movable in accordance with a sliding movement of the movable structural body. The case includes an inner face which extends in the sliding direction of the movable structural body. The slider is received within the case, and slides on the inner face of the case so that the slider is guided in the sliding direction of the movable structural body.

3 Claims, 7 Drawing Sheets

INSTALLATION APPARATUS

BACKGROUND OF THE INVENTION

This invention relates to an installation apparatus for installing a wire harness over a fixed structural body (such for example as a vehicle body of an automobile) and a movable structural body (such as a slide seat or a slide door) movable relative to the vehicle body.

For example, an electrically-operated auxiliary equipment such as an electrically-operated slide mechanism is contained in a slide seat and a slide door of a vehicle such as an automobile. A wire harness is installed over a vehicle body and the slide seat or the slide door in order to supply electric power to such auxiliary equipment. FIG. 7 shows one known related installation apparatus for installing a wire harness over a vehicle body and a slide door (see, for example, JP-A-2004-112984).

As shown in FIG. 7, the installation apparatus 101 disclosed in JP-A-2004-112984 includes a synthetic resin-made case 105 which includes a box-like base portion 102 and a plate-like lid 103, and receives a wire harness 104 folded back into a U-shape, a slider 107 engaged with a guide rail 106 of the base portion 102 so as to slide therealong, and a harness holding member 108 which is supported on the slider 107, and receives and protects a wire harness portion 104a led out of the case 105.

This installation apparatus 101 is mounted in a vertically-disposed condition on a slide door, and the wire harness portion 104a (which is one end-side portion of the wire harness 104), led out of the case via the harness holding member 108, is connected to a power source and others of a vehicle body, and the other end of the wire harness 104 is connected to an auxiliary equipment of the slide door and others. In accordance with the sliding movement of the slide door, the harness holding member 108, holding the wire harness portion 104a, moves along the guide rail 106 together with the slider 107 while suitably deforming the wire harness 104 within the case 105.

In the above installation apparatus 101, the sliding movement of the slider 107 is guided by the guide rail 106 provided at the base portion 102 of the case 105. This guide rail 106 comprises a pair of ribs 111 formed respectively at upper and lower edges of a recess portion 110 formed in a base plate portion 109 of the base portion 102, and the shape of this guide rail 106 is relatively complicated. Therefore, it is not easy to mold the guide rail 106 integrally with the synthetic resin-made case 105, and it is desired to simplify the guide mechanism of the slider 107. It may be proposed to form the guide rail 106 separately from the case 105. In this case, however, it is feared that the cost of the installation apparatus 101 is increased by an increased number of component parts.

The JP-A-2004-112984 suggests the application of the installation apparatus 101 to a slide seat. In this case, usually, the case 105 is mounted in a horizontally-disposed condition on the vehicle body, and the wire harness portion 104 (one end portion of the wire harness 104), led out of the case via the harness holding member 108, is connected to an auxiliary equipment of the slide seat and others, and the other end of the wire harness is connected to a power source and others of the vehicle body. Here, there is a possibility that a foreign matter intrudes into the case 105 through a slit-like opening 112 (in which the harness holding member 108 is disposed) in the case 105, and it is feared that the sliding movement of the slider 107 and harness holding member 108 is adversely affected by this foreign matter.

As shown in FIG. 8, the installation apparatus 1101 disclosed in JP-A-10-112922 includes a case 1102 of a generally rectangular tubular shape, and a slider 1103 movable along an upper outer surface of the case 1102 in a direction of sliding movement of the slide seat, and the wire harness 1104 is received in the case 1102 in such a manner that this wire harness is folded back into a generally U-shape.

One end of the wire harness 1104 is connected to an inner connector of the slider 1103 inserted into the interior of the case 1102 through a slit 1105 formed in an upper wall of the case 1102 and extending over an entire length thereof. The other end of the wire harness is connected to a connector 1106 provided at an end portion of the case 1102.

The inner connector of the slider 1103 is continuous with an outer connector 1107, and another wire harness, connected to an auxiliary equipment of the slide seat and others, is connected to this outer connector 1107. On the other hand, a wire harness, connected to a power source on the vehicle body, is connected the connector 1106 provided at the end portion of the case 1102.

When the slider 1103 moves in accordance with the sliding movement of the slide seat, the wire harness 1104, while suitably deformed, follows the slider 1103 with its U-shaped folded-back portion moved forward and rearward.

In the above installation apparatus 1101, when the slider 1103 moves, the wire harness 1104, while suitably deformed, follows the slider 1103 in such a manner that the U-shaped folded-back portion moves forward and backward in the direction of sliding movement in sliding contact with a bottom wall of the case 1102. Here, there is a possibility that foreign matters intrude into the case 1102 through the slit 1105 through which the inner connector of the slider 1103 is inserted into the case 1102, and these foreign matters will deposit on the bottom wall of the case 1102. Therefore, it is feared that the wire harness 1104 sliding on the bottom wall is damaged.

Furthermore, in the above installation apparatus 1101, a plurality of projecting piece portions each with a screw passage hole are usually formed on the outer surface of the case 1102, and screws are passed respectively through the screw passage holes of the projecting piece portions, and the case 1102 is fastened to the vehicle body by these screws. In this case, a space required for installing the installation apparatus 1101 is increased by an amount corresponding to the projecting piece portions.

SUMMARY OF THE INVENTION

This invention has been made in view of the above circumstances, and a first object of the invention is to provide an installation apparatus which is simplified in structure, and is so excellent in reliability that its operation will not be affected by the intrusion of a foreign matter.

Also, a second object of the invention is to provide an installation apparatus and a structure of mounting this installation apparatus, in which a wire harness is prevented from being damaged by foreign matters intruding into a case, and a compact design of the installation apparatus can be achieved.

The above object has been achieved by an installation apparatus of the present invention recited in the following Paragraphs (1) to (6).

(1) An installation apparatus for installing a wire harness over a fixed structural body and a movable structural body which is slidably provided to the fixed structural body, the installation apparatus comprises:

a case that receives the wire harness such that the wire harness extends in a sliding direction of the movable structural body, and is folded back into a generally U-shape; and a slider that holds a distal end-side portion of the wire harness extending from the folded-back portion toward a distal end of the wire harness, and is slidably supported on the case so as to move in the sliding direction of the movable structural body, and is movable in accordance with a sliding movement of the movable structural body, wherein the case includes an inner face which extends in the sliding direction of the movable structural body; and wherein the slider is received within the case, and slides on the inner face of the case so that the slider is guided in the sliding direction of the movable structural body.

(2) The installation apparatus of the above Paragraph (1), wherein at least one rib is provided on a bottom wall of the case, and extends in the sliding direction of the movable structural body; and wherein the slider is mounted on the rib.

(3) The installation apparatus of the above Paragraph (2), wherein the at least one rib is two ribs which are spaced from each other;

wherein a slit is formed in an upper wall of the case, and extends in the sliding direction of the movable structural body;

wherein the distal end of the wire harness is led out from the case through the slit; and wherein a width of the slit is smaller than the distance between the two ribs, and the slit is disposed above the two ribs.

(4) An installation apparatus for installing a wire harness over a fixed structural body and a movable structural body which is slidably provided to the fixed structural body, the installation apparatus comprises:

a case that receives the wire harness such that the wire harness extends in a sliding direction of the movable structural body, and is folded back into a generally U-shape; and a slider that holds a distal end-side portion of the wire harness extending from the folded-back portion toward a distal end of the wire harness, and is slidably supported on the case so as to move in the sliding direction of the movable structural body, and is movable in accordance with a sliding movement of the movable structural body, wherein at least one rib is provided on a wall of the case, and extends in the sliding direction of the movable structural body, and an extending direction of the rib intersects the folded-back portion of the wire harness.

(5) An installation apparatus of the above Paragraph (4), wherein the at least one rib is two ribs which are spaced from each other;

wherein a slit is formed in an upper wall of the case, and extends in the sliding direction of the movable structural body;

wherein the distal end of the wire harness is led out from the case through the slit; and wherein a width of the slit is smaller than the distance between the two ribs, and the slit is disposed above the two ribs.

(6) A structure of mounting an installation apparatus as defined in the above Paragraph (4), wherein the at least one rib is two ribs which are spaced from each other;

wherein the case is fastened to the fixed structural body by a fastening member passing through a part of the bottom wall of the case arranged between the two ribs; and wherein the two ribs are formed such that heights of the ribs are higher than a head of the fastening member projecting into the case.

In the installation apparatus of the construction of the above Paragraph (1), the slider can move in sliding contact with the inner face of the case receiving the wire harness, and therefore the slider is guided in the direction of sliding movement. Therefore, it is not necessary to provide any guide rail (as used in the related structure) for guiding the slider in the direction of sliding movement, and therefore the guide mechanism of the slider and hence the structure of the installation apparatus can be simplified. Therefore, the cost of the installation apparatus can be reduced, and also the lightweight design of the installation apparatus can be achieved.

In the installation apparatus of the construction of the above Paragraph (2), when foreign matters intrude into the case, these foreign matters deposit on the bottom wall of the case. However, the slider is placed on the rib, and therefore is spaced from the bottom wall of the case, and therefore the movement of the slider will not be affected by the foreign matters, and thus the operation thereof will not be affected by the intrusion of the foreign matters Furthermore, in the installation apparatus of this construction, sliding friction between the slider and the rib is smaller than sliding friction between the slider and the bottom wall of the case, and therefore the sliding movement of the slider can be effected more smoothly.

In the installation apparatus of the construction of the above Paragraph (3), foreign matters intrude into the case mainly through the slit through which the distal end of the wire harness is led out of the case. However, the width of the slit is smaller than the distance between the two ribs, and the slit is disposed in overlying relation to the two ribs. Therefore, foreign matters, intruding into the case through the slit, are received between the two ribs, and can be prevented from being scattered to other regions within the case such for example as wire harness receiving regions in which the wire harness is received. Therefore, the operation of the installation apparatus can be more positively effected, so that its reliability can be enhanced.

In the present invention, there can be provided the installation apparatus which is simplified in structure, and is so excellent in reliability that its operation will not be affected by the intrusion of a foreign matter.

In the installation apparatus of the construction of the above Paragraph (4), when foreign matters intrude into the case, these foreign matters deposit on the bottom wall of the case. However, the folded-back portion of the wire harness which moves forward and rearward in the direction of sliding movement of the slider in accordance with the sliding movement of the slider is spaced by the rib from the bottom wall of the case, and therefore the folded-back portion of the wire harness is prevented from sliding contact with the bottom wall on which the foreign matters deposit, so that damage of the wire harness can be prevented.

Furthermore, in the installation apparatus of this construction, sliding friction between the folded-back portion of the wire harness and the rib is smaller than sliding friction between the folded-back portion of the wire harness and the bottom wall of the case, and therefore the sliding movement of the folded-back portion of the wire harness can be effected more smoothly.

In the installation apparatus of the construction of the above Paragraph (5), foreign matters intrude into the case mainly through the slit through which the distal end of the wire harness is led out of the case. However, the width of the slit is smaller than the distance between the two ribs, and the slit is disposed in overlying relation to the two ribs. Therefore, foreign matters, intruding into the case through the slit, are received between the two ribs, and can be prevented from being scattered to wire harness receiving regions in which the wire harness is received. Therefore, damage of the wire harness by the foreign matters can be more positively prevented.

In the installation apparatus mounting structure of the construction of the above Paragraph (6), the fastening member, fastening the installation apparatus to the fixed structural body, is disposed between the two ribs, that is, within the case, and therefore a space required for installing the installation apparatus can be made smaller as compared with the conventional construction in which the plurality of projecting piece portions are formed on the outer surface of the case, and therefore the compact and lightweight design of the installation apparatus can be achieved.

The fastening member is disposed between the two ribs, and the two ribs are higher than the head of the fastening member projecting into the case. Therefore, the folded-back portion of the wire harness, moving forward and rearward in the direction of sliding movement of the slider in accordance with the sliding movement of the slider, and the slider will not be caught by the head of the fastening member. Thus, there is no fear that the fastening member, disposed within the case, will affect the operation of the installation apparatus, and therefore the fastening member can be freely arranged generally on the center axis.

In the present invention, there can be provided the installation apparatus and the structure of mounting this installation apparatus, in which the wire harness is prevented from being damaged by foreign matters intruding into the case, and the compact design of the installation apparatus can be achieved.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A preferred embodiment of an installation apparatus of the present invention will now be described in detail with reference to the drawings.

Figure 1:
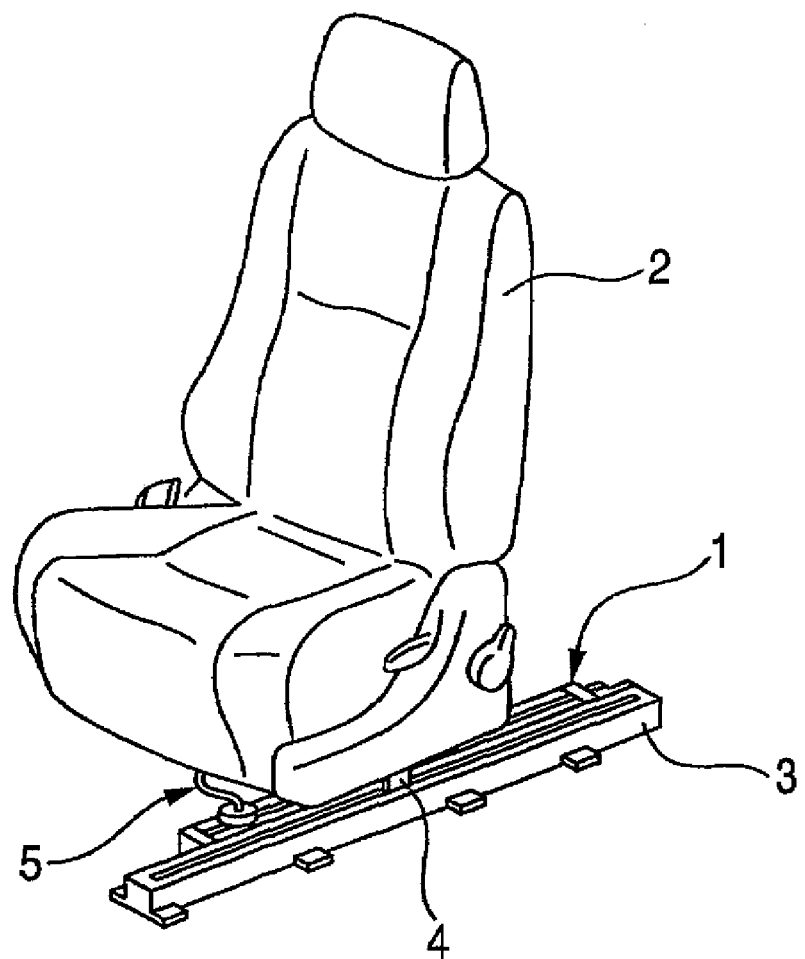
FIG. 1 is a perspective view showing one preferred embodiment of an installation apparatus of the present invention applied to a slide seat for a vehicle.
Figure 2:
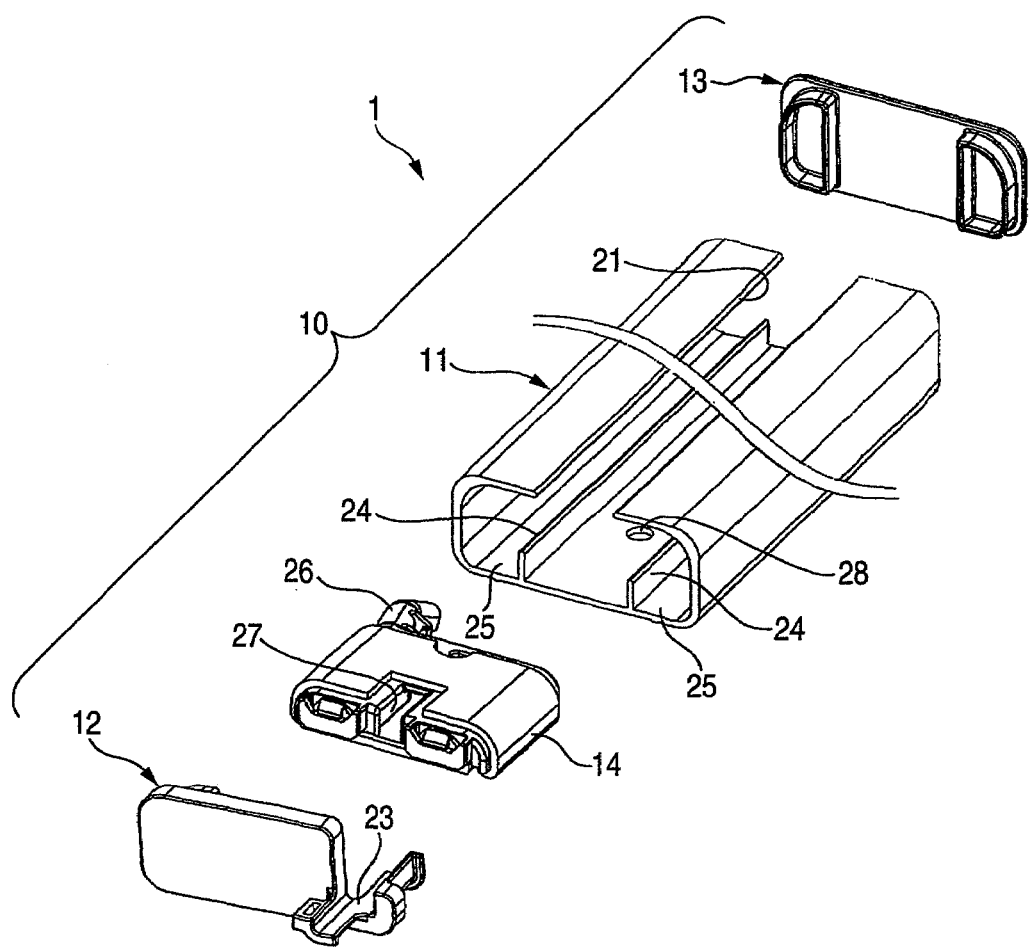
FIG. 2 is an exploded, perspective view of the installation apparatus of FIG. 1.
Figure 3:
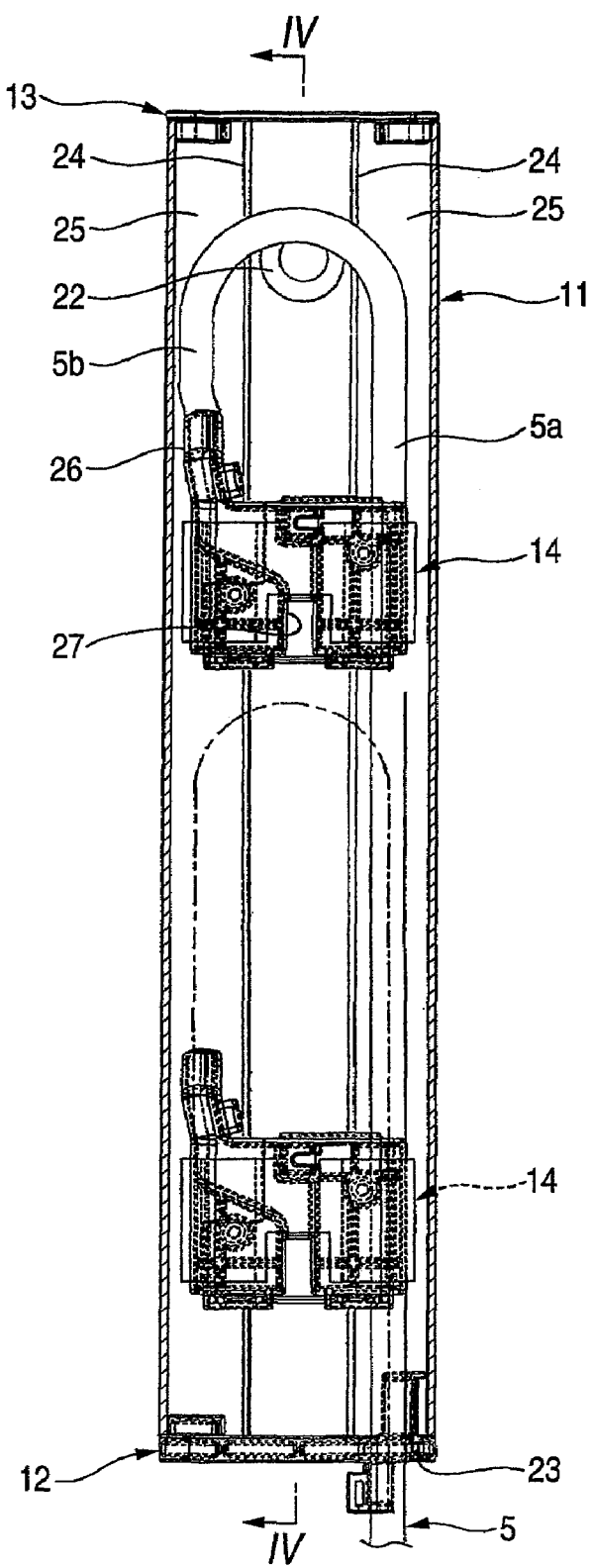
FIG. 3 is a plan view of the installation apparatus of FIG. 1.
Figure 4:
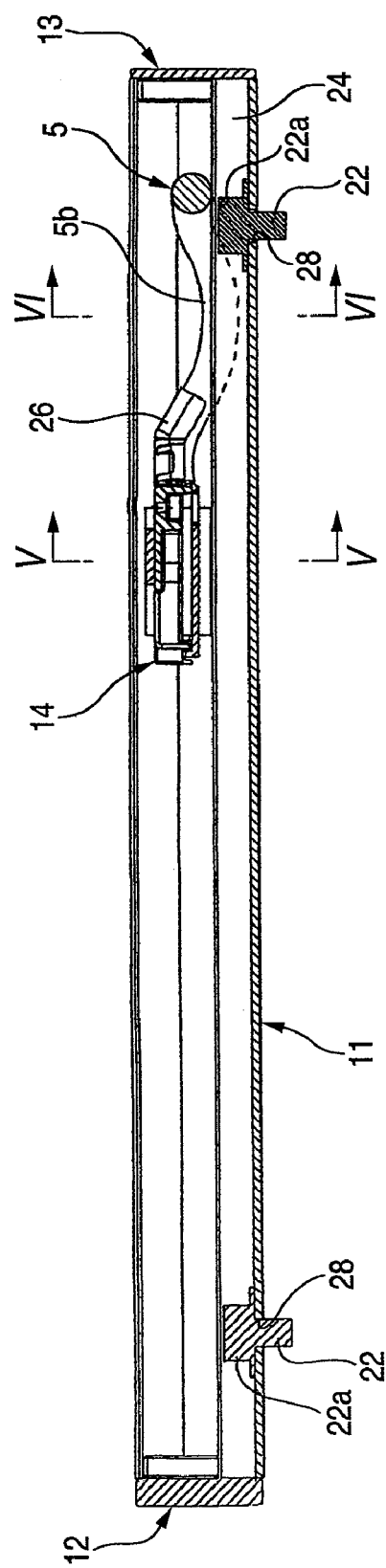
FIG. 4 is a cross-sectional view taken along the line IV-IV of FIG. 3.
Figure 5:
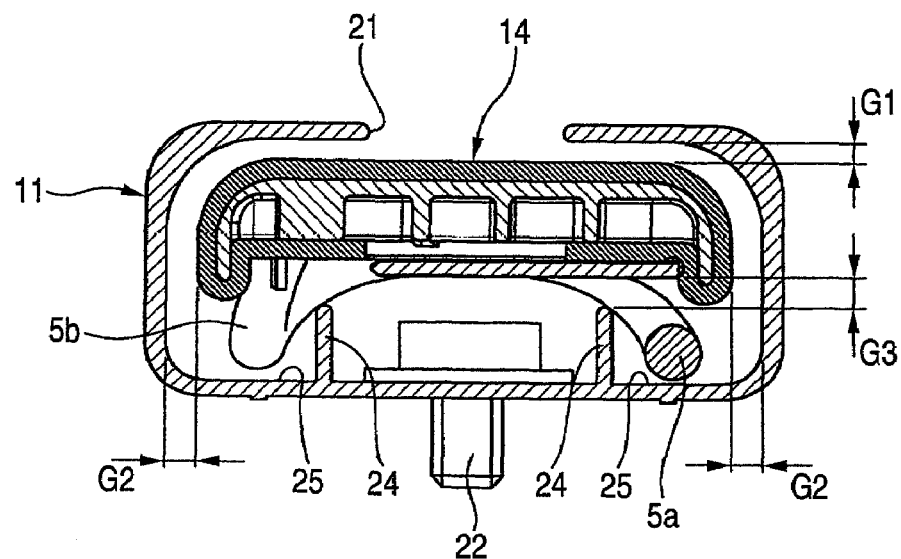
FIG. 5 is a cross-sectional view taken along the line V-V of FIG. 4.
Figure 6:
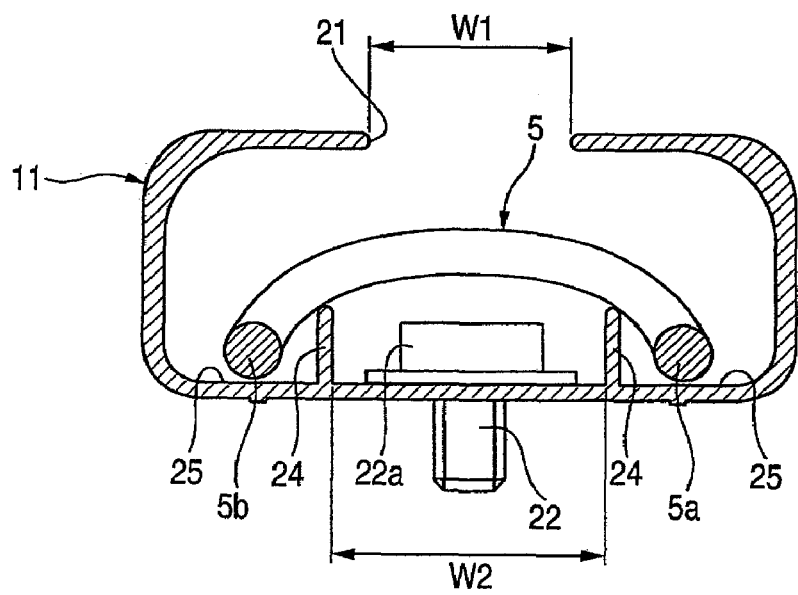
FIG. 6 is a cross-sectional view taken along the line VI-VI of FIG. 4.
Figure 7:
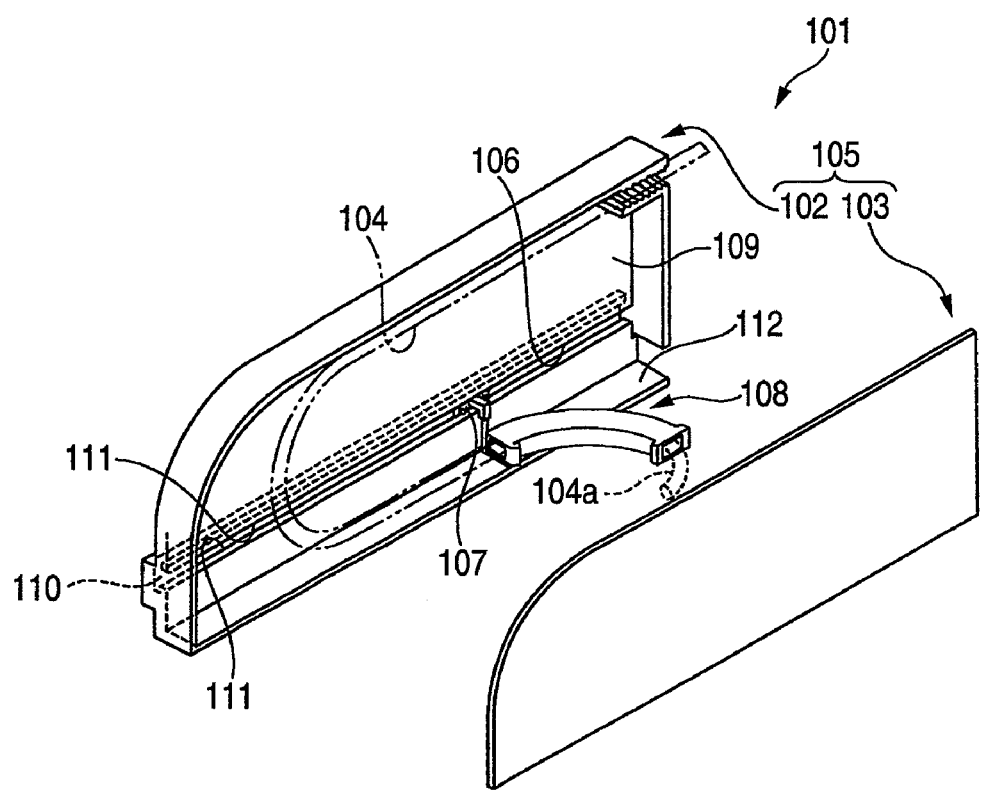
FIG. 7 is an exploded, perspective view of a related installation apparatus.
Figure 8:
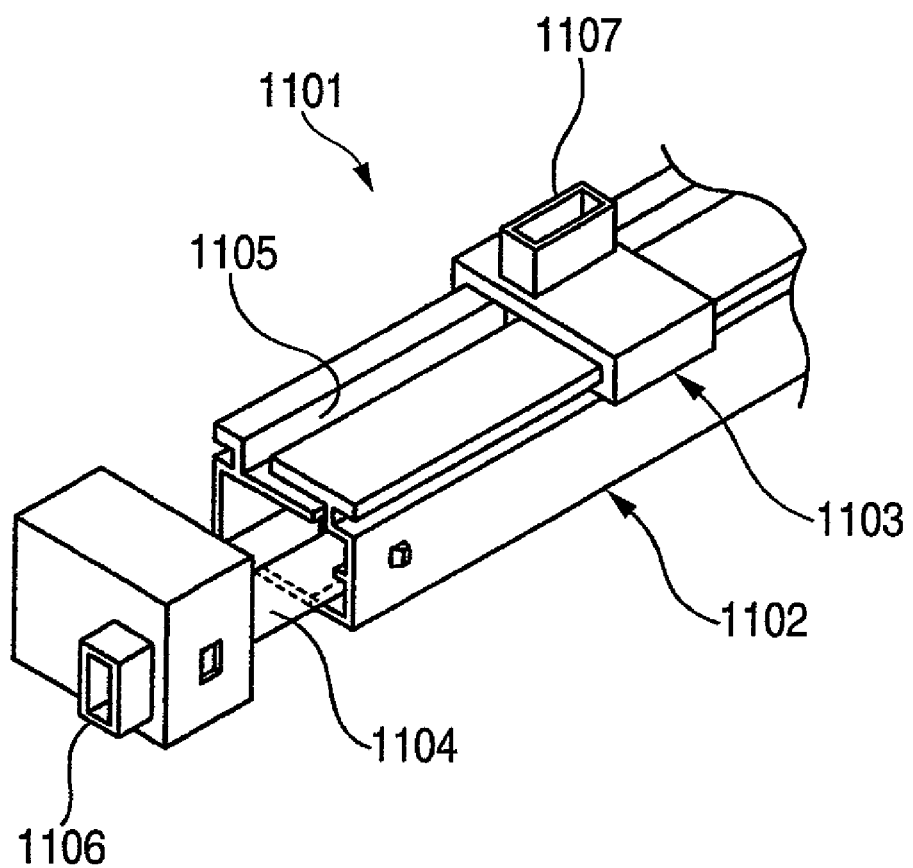
FIG. 8 is an exploded, perspective view of the related installation apparatus.

FIG. 1 is a perspective view showing one preferred embodiment of the installation apparatus of the invention applied to a slide seat for a vehicle, FIG. 2 is an exploded, perspective view of the installation apparatus of FIG. 1, FIG. 3 is a plan view of the installation apparatus of FIG. 1, FIG. 4 is a cross-sectional view taken along the line IV-IV of FIG. 3, FIG. 5 is a cross-sectional view taken along the line V-V of FIG. 4, and FIG. 6 is a cross-sectional view taken along the line VI-VI of FIG. 4.

As shown in FIG. 1, the installation apparatus 1 of this embodiment is applied to the slide seat (movable structural body) 2 for the vehicle. A guide rail 3 is mounted on a vehicle body (fixed structural body which is not shown), and extends in a forward-rearward direction of the vehicle body. A slider 4 is mounted on a bottom surface of the slide seat 2, and is engaged in the guide rail 3, and is supported on this guide rail 3 so as to slide in the forward-rearward direction of the vehicle body. With this construction, the slide seat 2 can slide in the forward-rearward direction of the vehicle body. The installation apparatus 1 is provided along the guide rail 3 in parallel, adjoining relation thereto, and installs a wire harness 5 over the vehicle body and the slide seat 2.

As shown in FIG. 2, the installation apparatus 1 comprises a case 10, and the slider 14 received within the case 10. The case 10 includes a case body 11 in the form of an elongate rectangular tubular member having a slit 21 formed in its upper wall and extending over an entire length thereof in the longitudinal direction thereof, and caps 12 and 13 mounted respectively at opposite end portions of the case body 11 to close these open ends. The case body 11 is mounted on the vehicle body, with its longitudinal axis disposed parallel to the direction of sliding movement of the slide seat 2.

An opening 23 is formed in one side of the cap 12 mounted at one end portion of the case body 11, and the wire harness 5, extending from the vehicle body, is introduced or led into the case 10 through this opening 23. The wire harness 5, led into the case 10 through this opening 23, is received in the case 10 in such a manner that this wire harness 5 is folded back into a U-shape as shown in FIG. 3. In FIG. 3, the case body 11 is shown with its upper wall removed.

As shown in FIG. 2, two ribs 24 and 24 are formed on and project from a bottom wall of the case body 11, and extend in the longitudinal direction of the case body 11, and are spaced from each other. A gap (hereinafter referred to as "wire harness receiving region 25") for receiving the wire harness 5 is formed between each rib 24 and a side wall of the case body 11 opposed to this rib 24.

As shown in FIGS. 3, 4 and 6, the wire harness 5, led into the case 10 through the opening 23 in the cap 12, is laid to extend in and along one wire harness receiving region 25 communicating with the opening 23, and then is folded back into a U-shape while passing over the ribs 24 and 24, and is further laid to extend in and along the other wire harness receiving region 25. Namely, the two ribs 24 and 24 are disposed between an outward portion 5a and a return portion 5b of the wire harness 5 extending in the longitudinal direction of the case body 11, and in other words the two ribs 24 and 24 are arranged to intersect the U-shaped folded-back portion of the wire harness 5. The folded-back portion of the wire harness 5 is placed on the two ribs 24 and 24, and is spaced from the bottom wall of the case body 11.

As shown in FIG. 5, the slider 14 which is received within the case 10 is formed such that a small gap G1 is formed between the slider 14 and the upper wall of the case body 11, that a smaller gap G2 is formed between the slider 14 and each of the opposite side walls of the case body 11 and that a small gap G3 is formed between the slider 14 and each of the ribs 24 and 24. The slider 14 is placed on the two ribs 24 and 24, and is supported for sliding movement in the longitudinal direction of the case body 11. The sum of the gaps G1 and G3, as well as the sum of the gaps G2 and G2, is smaller than the diameter of the wire harness 5. The slider 14 can slide on inner surfaces of the opposite side walls of the case body 11 and upper edges of the two ribs 24 and 24, and therefore the sliding movement of the slider 14 is guided by these inner surfaces and these upper edges. In other words, the whole of the case body 11 functions as a related guide rail for guiding the sliding movement of the slider 14.

As shown in FIGS. 2, 3 and 4, an introduction tube 26 is formed on and extends from one end of the slider 14, and this introduction tube 26 extends along the other wire harness receiving region 25 (in which that portion (i.e., the return portion 5b) of the wire harness 5, extending from the folded-back portion thereof toward the distal end thereof, is laid). This introduction tube 26 introduces the wire harness 5 into the slider 14. The distal end of the wire harness 5, introduced into the slider 14 through the introduction tube 26, passes through the slider 14, and is led out of the slider 14 through an opening 27 which is open upwardly at a widthwise-central portion of the slider 14. The wire harness 5, passing through the slider 14, is held at a portion thereof by the introduction tube 26.

The distal end of the wire harness 5, led out of the slider 14 through the opening 27 thereof, is further led out of the case 10 through the slit 21 formed in the upper wall of the case body 11, and is connected to an auxiliary equipment of the slide seat 2 and others. The slider 14 is connected via the slit 21 to the slide seat 2, for example, by a hook, and can slide together with the slide seat 2.

In accordance with the sliding movement of the slide seat 2, the slider 14, holding the predetermined portion of the wire harness 5, slides in sliding contact with the inner surfaces of the opposite side walls of the case body 11 and the upper edges of the two ribs 24 and 24 (that is, while guided by these inner surfaces and these upper edges) while suitably deforming the wire harness 5 within the case 10, with the folded-back portion of the wire harness 5 moved forward and rearward in the direction of sliding movement of the slider 14, as shown in FIG. 3. One side portion of the slider 14 overlies the outward portion 5a of the wire harness 5, and the slider 14 slides while suppressing the lifting of the outward portion 5a off the bottom wall of the case body 11.

As shown in FIG. 1, the slit 21 is formed in the widthwise-central portion of the upper wall of the case body 11, and extends over the entire length of the case body 11 in the longitudinal direction thereof. As shown in FIG. 6, a width W1 of the slit 21 is smaller than the distance W2 between the two ribs 24 and 24 formed on the bottom wall of the case body 11, and the slit 21 is disposed vertically above the region between the two ribs 24 and 24. Therefore, when foreign matters intrude into the case 10 through the slit 21, these foreign matters are received between the two ribs 24 and 24.

The case body 11 is fastened to the vehicle body, and thus is mounted on the vehicle body. Screw passage holes 28 are formed through that portion of the bottom wall of the case body 11 lying between the two ribs 24 and 24, and bolts (fastening members) 22 are passed respectively through the screw passage holes 28, and are threaded into the vehicle body. As shown in FIGS. 4 and 6, the two ribs 24 and 24 are formed such that these ribs are higher than heads 22a of the bolts 22. An impact wrench (tool) for fastening each bolt 22 is inserted into the case 10 from the upper side through the slit 21.

When the slider 14 is moved in accordance with the sliding movement of the slide seat 2, the outward portion 5a and return portion 5b of the wire harness 5 are reciprocally extended and shortened in such a manner that the U-shaped folded-back portion of the wire harness 5, while sliding over the upper edges of the two ribs 24 and 24, is moved forward and rearward in the direction of sliding movement of the slider 14, as shown in FIG. 3. Here, the bolts 22 are disposed between the two ribs 24 and 24, and the two ribs 24 and 24 are higher than the heads 22a of the bolts 22, and therefore the folded-back portion of the wire harness 5 and the slider 14 are smoothly moved forward and rearward without being caught by the heads 22a of the bolts 22.

In the installation apparatus 1 of this embodiment, the slider 14 can move in sliding contact with the inner surfaces of the case body 11 receiving the wire harness 05, and therefore the slider 14 is guided in the direction of sliding movement. Therefore, it is not necessary to provide any guide rail (as used in the related structure) for guiding the slider in the direction of sliding movement, and therefore the guide mechanism of the slider 14 and hence the structure of the installation apparatus 1 can be simplified. Therefore, the cost of the installation apparatus 1 can be reduced, and also the lightweight design of the installation apparatus 1 can be achieved.

In the installation apparatus 1 of this embodiment, when foreign matters intrude into the case 10, these foreign matters deposit on the bottom wall of the case body 11. However, the slider 14 is placed on the ribs 24, and therefore is spaced from the bottom wall of the case body 11, and therefore the movement of the slider 14 will not be affected by the foreign matters, and thus the operation thereof will not be affected by the intrusion of the foreign matters Furthermore, in the installation apparatus 1 of this embodiment, sliding friction between the slider 14 and the ribs 24 is smaller than sliding friction between the slider 14 and the bottom wall of the case body 11, and therefore the sliding movement of the slider 14 can be effected more smoothly.

In the installation apparatus 1 of this embodiment, foreign matters intrude into the case 10 mainly through the slit 21 through which the distal end of the wire harness 5 is led out of the case 10. However, the width of the slit 21 is smaller than the distance between the two ribs 24 and 24, and the slit 21 is disposed in overlying relation to the two ribs 24 and 24. Therefore, foreign matters, intruding into the case 10 through the slit 21, are received between the two ribs 24 and 24, and can be prevented from being scattered to other regions within the case 10 such for example as the wire harness receiving regions 25 in which the wire harness 5 is received. Therefore, damage of the wire harness 5 by the foreign matters can be more positively prevented. Also, the operation of the installation apparatus 1 can be more positively effected, so that its reliability can be enhanced.

The upper wall of the case body 11 is divided into two wall sections by the slit 21, and each of the two wall sections is supported in a cantilever-like manner. In the installation apparatus 1 of this embodiment, the slider 14 is received within the case body 11 in such a manner that the gap is formed between the slider 14 and the upper wall of the case body 11. Therefore, the operation of the slider 14 is seldom affected even when the upper wall of the case body 11 is bent, and besides when the upper wall of the case body 11 is excessively bent, the upper wall of the case body 11 can be supported by the slider 14 within the case body 11, thereby preventing the excessive bending of the upper wall of the case body 11, so that the reliability of the installation apparatus 1 can be enhanced.

In the installation apparatus 1 of this embodiment, when foreign matters intrude into the case 10, these foreign matters deposit on the bottom wall of the case 10. However, the folded-back portion of the wire harness 5 which moves forward and rearward in the direction of sliding movement of the slider 14 in accordance with the sliding movement of the slider 14 is spaced by the ribs 24 from the bottom wall of the case body 11, and therefore the folded-back portion of the wire harness 5 is prevented from sliding contact with this bottom wall on which the foreign matters deposit, so that damage of the wire harness 5 can be prevented.

Furthermore, in the installation apparatus 1 of this embodiment, sliding friction between the folded-back portion of the wire harness 5 and the two ribs 24 is smaller than sliding friction between the folded-back portion of the wire harness 5 and the bottom wall of the case body 11, and therefore the sliding movement of the folded-back portion of the wire harness 5 can be effected more smoothly.

Furthermore, in the installation apparatus 1 of this embodiment, the bolts 22, fastening this installation apparatus 1 to the vehicle body, are disposed between the two ribs 24 and 24, that is, within the case 10, and therefore a space required for installing the installation apparatus 1 can be made smaller as compared with a related construction in which a plurality of projecting piece portions are formed on the outer surface of the case 10.

The bolts 22 are disposed between the two ribs 24 and 24, and the two ribs 24 and 24 are higher than the heads 22a of the bolts 22 projecting into the case. Therefore, the folded-back portion of the wire harness 5, moving forward and rearward in the direction of sliding movement of the slider 14 in accordance with the sliding movement of the slider 14, and the slider 14 will not be caught by the head 22a of each bolt 22. Thus, there is no fear that the bolts 22, disposed within the case 10, will affect the operation of the installation apparatus 1.

The present invention is not limited to the above embodiment, and suitable modifications, improvements, etc., can be made.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2005-303297 filed on Oct. 18, 2005 and Japan Patent Application No. 2005-303298 filed on Oct. 18, 2005, the contents of which are incorporated herein for reference.

What is claimed is:

1. An installation apparatus for installing a wire harness over a fixed structural body and a movable structural body which is slidably provided to the fixed structural body, the installation apparatus comprising:
    a case that receives the wire harness such that the wire harness extends in a sliding direction of the movable structural body, and is folded back into a generally U-shape; and
    a slider that holds a distal end-side portion of the wire harness extending from the folded-back portion toward a distal end of the wire harness, and is slidably supported within the case so as to move in the sliding direction of the movable structural body, and is movable in accordance with a sliding movement of the movable structural body,
    wherein the case includes opposing side walls each having an inner face which extends in the sliding direction of the movable structural body, each said inner face acting as a bearing surface; and
    wherein the slider is received within the case, and slides on the bearing surface associated with each said inner face so that the slider is guided in the sliding direction of the movable structural body.

2. The installation apparatus according to claim 1, wherein at least one rib, which extends in the sliding direction of the movable structural body, is provided on a bottom wall of the case; and
    wherein the slider is mounted on the rib.

3. The installation apparatus according to claim 2, wherein the at least one rib is two ribs which are spaced from each other;
    wherein a slit is formed in an upper wall of the case, and extends in the sliding direction of the movable structural body;
    wherein the distal end of the wire harness is led out from the case through the slit; and
    wherein a width of the slit is smaller than the distance between the two ribs, and the slit is disposed above the two ribs.

* * * * *